US008058896B2

(12) United States Patent
Deeley et al.

(10) Patent No.: US 8,058,896 B2
(45) Date of Patent: Nov. 15, 2011

(54) FLEXIBLE PARALLEL/SERIAL RECONFIGURABLE ARRAY CONFIGURATION SCHEME

(75) Inventors: Simon Deeley, Bristol (GB); Anthony Stansfield, Bristol (GB)

(73) Assignee: Panasonic Corporation, Osaka (JP)

( * ) Notice: Subject to any disclaimer, the term of this patent is extended or adjusted under 35 U.S.C. 154(b) by 41 days.

(21) Appl. No.: 12/576,040

(22) Filed: Oct. 8, 2009

(65) Prior Publication Data

US 2010/0090720 A1    Apr. 15, 2010

(30) Foreign Application Priority Data

Oct. 8, 2008  (EP) .................................. 08166153

(51) Int. Cl.
*G06F 7/38*   (2006.01)
*G06F 9/00*   (2006.01)
*G06F 9/44*   (2006.01)
*H03K 19/173* (2006.01)

(52) U.S. Cl. ................. 326/38; 326/37; 326/39; 326/40; 326/41; 326/101; 712/220; 712/221; 712/233; 712/235; 712/241

(58) Field of Classification Search .............. 326/37–41, 326/46–47, 101; 712/220–221, 223, 225–226, 712/233–237, 241
See application file for complete search history.

(56) References Cited

U.S. PATENT DOCUMENTS

| 2003/0055861 | A1* | 3/2003 | Lai et al. ........................ 708/620 |
| 2003/0184339 | A1* | 10/2003 | Ikeda et al. ..................... 326/47 |
| 2007/0113054 | A1* | 5/2007 | Guibert et al. ................. 712/226 |

OTHER PUBLICATIONS

European Search Report issued in European Patent Application No. EP 08166153.0-1243, dated Apr. 24, 2009.
R. Cucchiara et al., "Reconfiguring the boundaries of a mesh-connected array of processors with run-time programmable logic," Microprocessors and Microsystems, vol. 17, No. 2, 1993, pp. 67-73.

* cited by examiner

*Primary Examiner* — Shawki S Ismail
*Assistant Examiner* — Matthew C Tabler
(74) *Attorney, Agent, or Firm* — McDermott Will & Emery LLP

(57) ABSTRACT

A programming interface device for a programmable logic circuit comprises a series of parallel logic block chains each having first and second connection means, the first and second connection means being disposed at opposite ends of each chain. The programming interface device comprises first and second interfacing means for interfacing with the first and second connection means of each logic block chain, respectively and at least one programming circuit, each programming circuit arranged to configure a plurality of serially connected logic blocks. Finally, the programming interface comprises programmable connection means for connecting the connection means of each logic block chain to either the connection means of another logic block chain or directly to one of the at least one programming circuits, such that the parallel logic block chains can be configured in parallel, series or in any combination thereof.

2 Claims, 10 Drawing Sheets

FLEXIBLE PARALLEL/SERIAL RECONFIGURABLE ARRAY CONFIGURATION SCHEME

TECHNICAL FIELD

The present invention relates to the configuration of arrays forming part of re-configurable logic devices.

BACKGROUND

Some emerging re-configurable logic device architectures comprise grids of repeating re-configurable logic blocks. In some such architectures, each block comprises a program memory and connection means for inputting and outputting programming data into and out from the program memory. When these blocks are interconnected, the connection means link together to form chains of blocks. When several chains are placed side by side, an array of blocks can be created.

Each array is a hard-macro. That is to say that each array is preconfigured with physical pathways and wiring patterns between its components. Accordingly, once the array is hard-wired, it is difficult, if not impossible, to reconfigure it. There are several different types of arrays, each of which provide specific advantages.

For example, one type of array is a fully parallel array. The fully parallel array comprises several chains of blocks, the beginnings and ends of which are each connected to a programming interface. The fully parallel array provides the advantage of being able to be configured quickly. However, the programming interfaces necessary to configure this type of array will need to be more complex and will therefore have more overhead.

Another type of array is the fully serial array. The fully serial array comprises a single chain of blocks made of smaller interconnected chains of blocks. The beginning and end of this chain of blocks will be connected to a single programming interface. Although the programming interface needed to configure this type of array will be relatively simple, the actual programming of the array will take considerably longer than that of a fully parallel array.

As will be appreciated, each different type of array will have specific advantages and disadvantages. Accordingly, a specific array may be particularly well suited for one type of application, but not for another.

For example, some tasks can be split into multiple sub-tasks, with each sub-task being able to be carried out concurrently (without being linked to the progress of other sub-tasks). Accordingly, for any task, there are a number of sub-tasks which must be carried out one after the other (in serial) and others which can be carried out concurrently (in parallel).

Exploiting the possibility of parallelism typically leads to the whole task being faster than if all sub-tasks were carried out serially. There is however usually some structural overhead associated with the parallelism. In the case of array configuration, this overhead takes the form of a more complex programming interface. It is a common engineering dilemma to have to strike a balance between the benefits and costs of parallelizing a task.

However, a problem arises when a device is designed for a plurality of applications or, for a customer who has, as of yet, not designed the application for which the device is being purchased. In such a scenario, an estimate of the optimal degree of parallelism must be made in order to produce a device. Any variation between the estimate and the actual need will cause either degraded system performance (i.e. the configuration time will be too long) or reduced cost-effectiveness (i.e. a larger circuit than necessary will have been produced).

Accordingly, there is a clear need for a device comprising an array of logic blocks which can be re-configured either in series, in parallel or in any combination thereof.

SUMMARY

In order to solve the problems associated with the prior art, the present invention provides a programming interface device for a programmable logic circuit, the programmable logic circuit comprising a series of parallel logic block chains each having first and second connection means, the first and second connection means being disposed at opposite ends of each chain, the programming interface device comprises:

first and second interfacing means for interfacing with the first and second connection means of each logic block chain, respectively;

at least one programming circuit, each programming circuit arranged to configure a plurality of serially connected logic blocks; and programmable connection means for connecting the connection means of each logic block chain to either the connection means of another logic block chain or directly to one of the at least one programming circuits, such that the parallel logic block chains can be configured in parallel, series or in any combination thereof.

The programmable connection means may further comprise loop-back connections for connecting the connection means of each logic block chain to the connection means of another logic block chain.

The programming interface device may further comprise:

a control device for controlling the programming circuits and centrally executing functions which would otherwise be common to each programming circuit in the device.

The at least one programming circuit may be a Finite State Machine (FSM).

The present invention also provides a programmable logic device comprising at least one programming interface device in accordance with any of the preceding configurations.

As will be appreciated, the present invention provides several advantages. For example, a device according to the present invention can be re-arranged to optimise the performance of applications running on a plurality of systems, each having different requirements regarding configuration speed and overhead. Moreover, a single generic array can be applied to multiple systems and the array design can therefore be completed without knowledge of its intended purpose. Furthermore, because the programming interface can be parameterised by a user (i.e. a systems integrator as opposed to the manufacturer), the resulting designs can be tailored to their particular needs, thereby improving design flexibility in terms of overhead and configuration speed, and reducing costs.

BRIEF DESCRIPTION OF THE DRAWINGS

Examples of the present invention will now be described with reference to the following drawings, in which.

DETAILED DESCRIPTION

Figure 1:
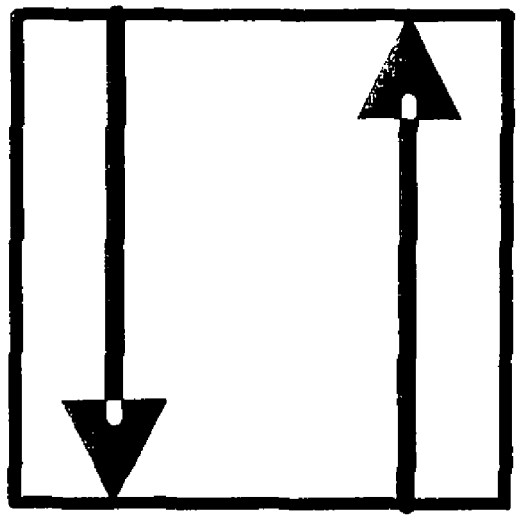
FIG. 1 is a diagram representing two blocks which may be interconnected to form a chain for use in an array included in a device in accordance with the present invention.
Figure 1:
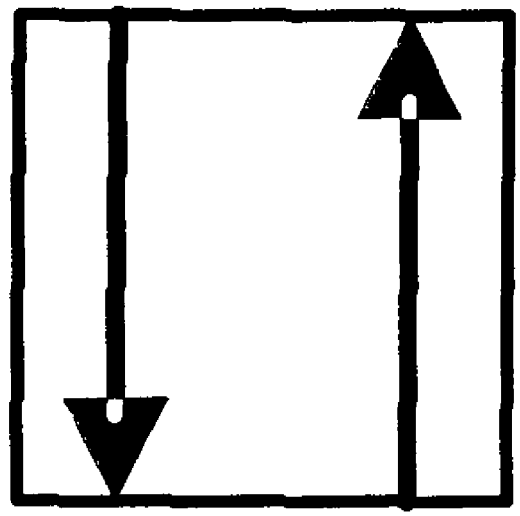

FIG. 1 represents the basic building blocks of the architecture used in the device of the present invention. The program in a programmable device is normally a bitmap of data stored in memory which is distributed throughout the device. For each element of the device that can be programmed, there is associated data stored in a specific memory unit.

Some reconfigurable logic technologies are composed of a grid of repeating blocks. Each block has input and output connection means and encloses some program memory.

Figure 2:
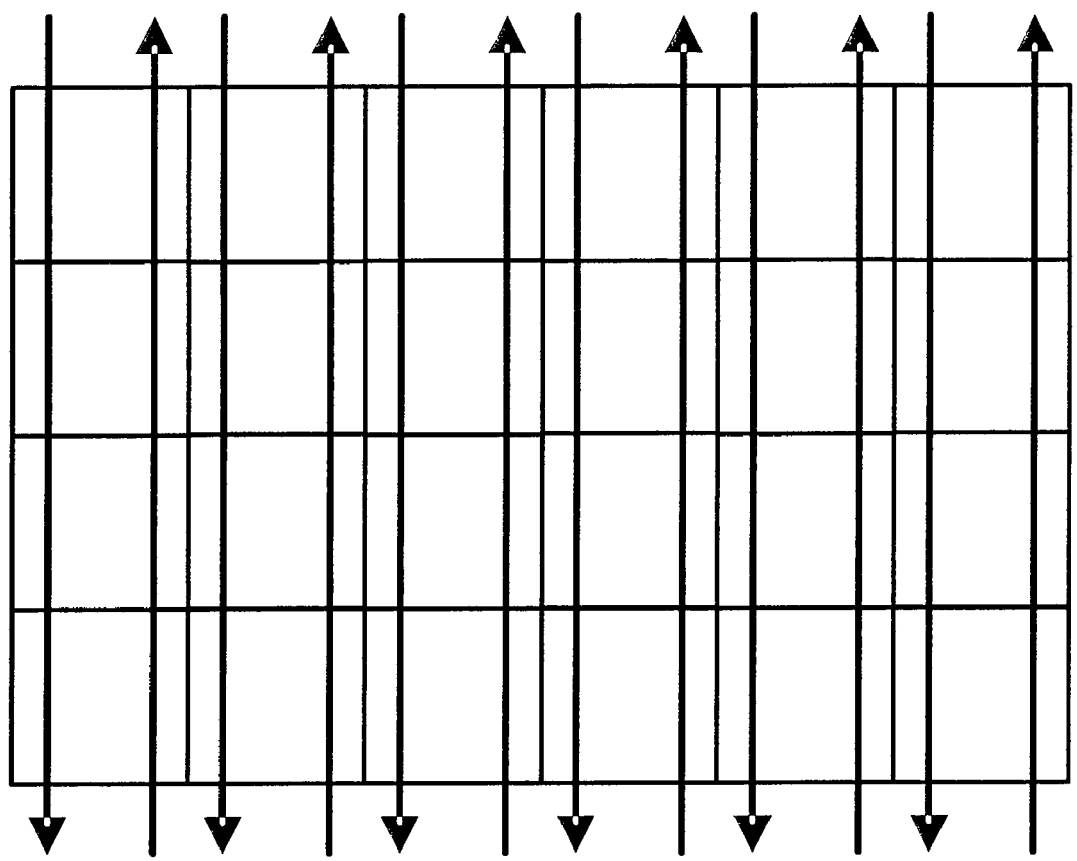
FIG. 2 is a diagram representing an array of interconnected blocks for use with a device in accordance with the present invention.

Now, with reference to FIG. 2, an array of interconnected blocks for use with a device in accordance with the present invention will now be described. When the blocks of FIG. 1 are stacked, the connection means at the top and the bottom of each block link together. At the extreme tops and bottoms of the chain of blocks, the connection means are left exposed. Accordingly, each block in a chain can be programmed through the chained connection means within each column.

Figure 3:
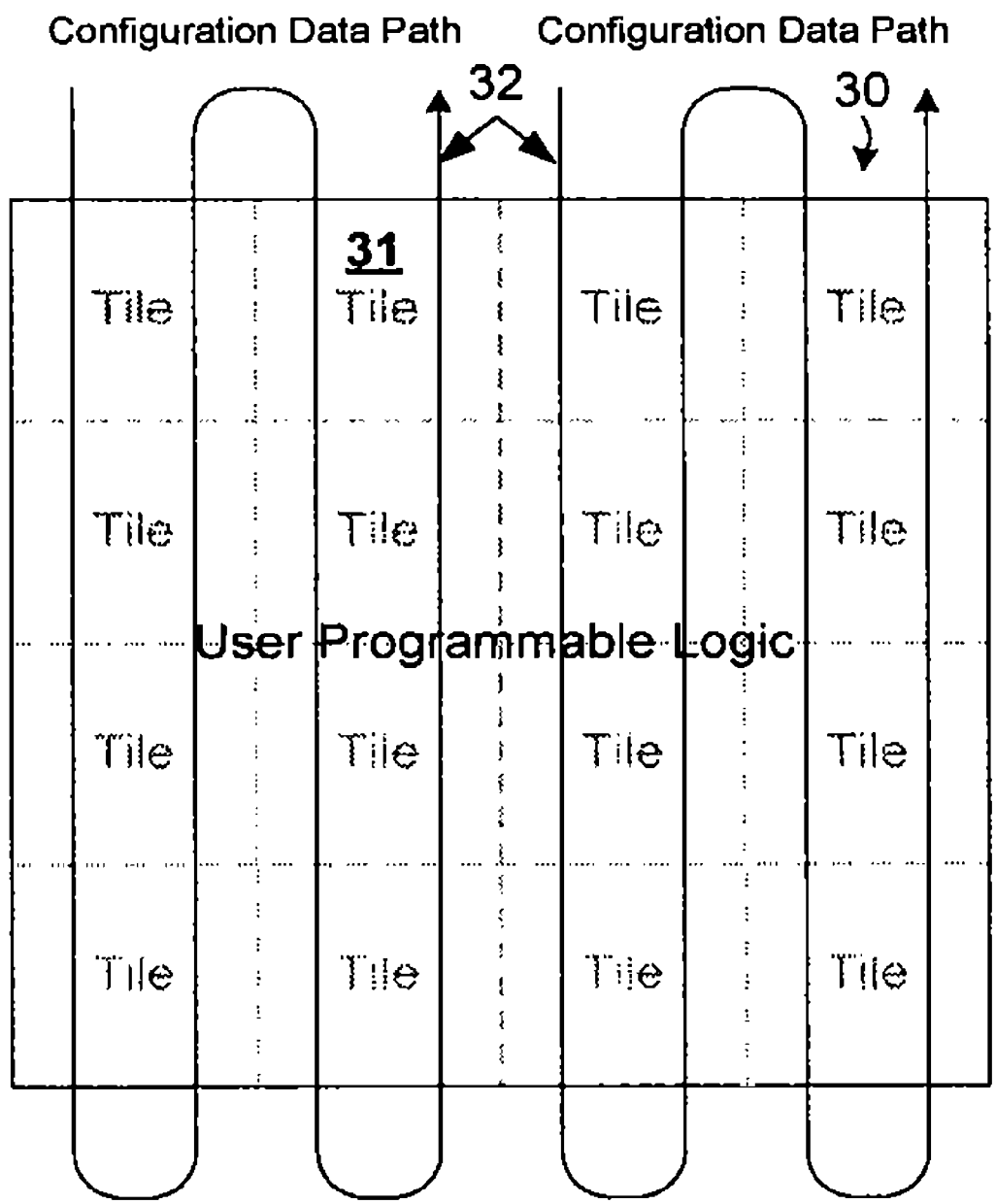
FIG. 3 is a diagram representing an array of interconnect blocks comprising a hardwired configuration path.

FIG. 3 shows a diagram representing a programmable logic device 30 which is made of a plurality of tiles 31. Each tile 31 contains a plurality of configuration registers (not shown) which are linked by a configuration data path 32.

Figure 4:
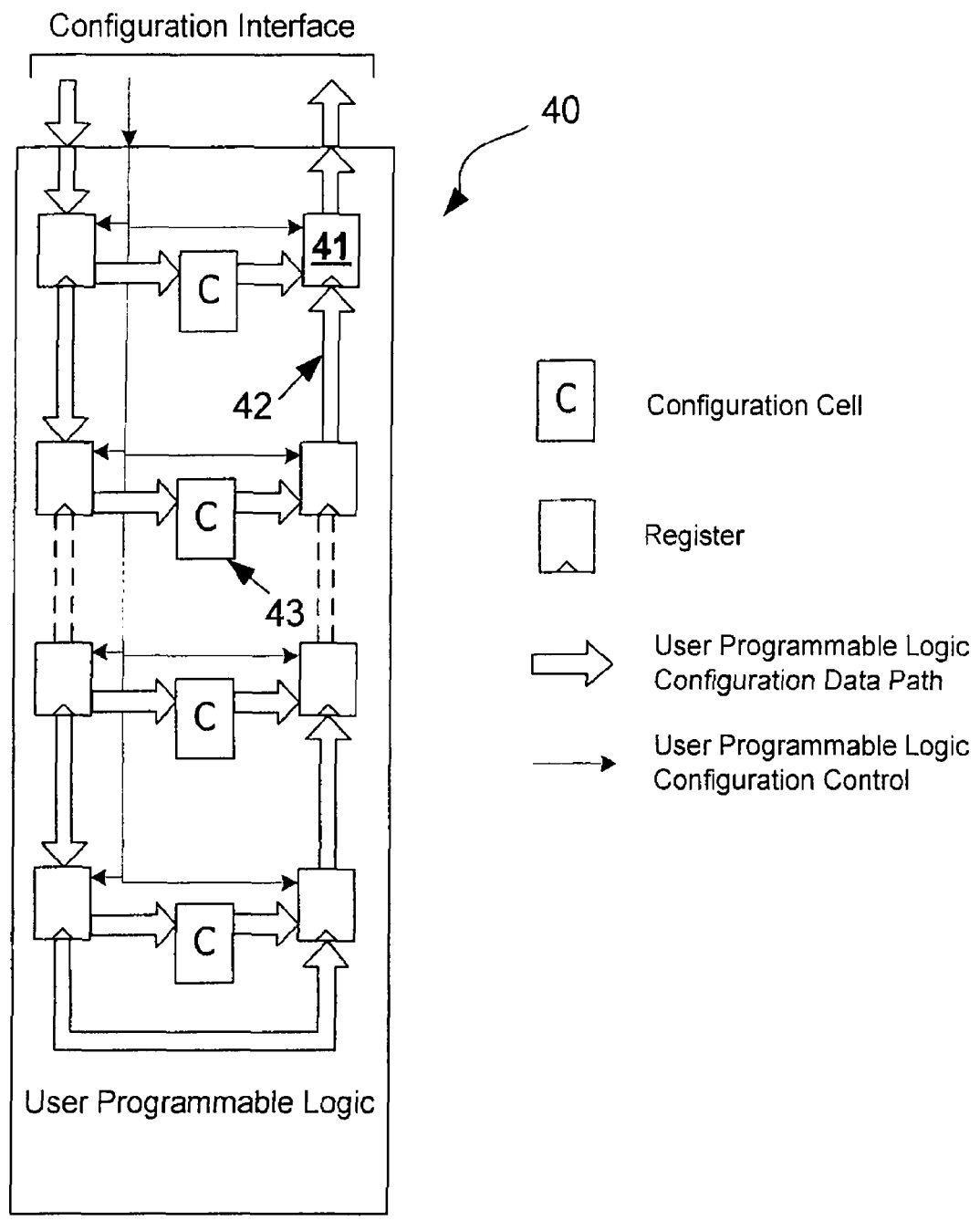
FIG. 4 is a diagram representing a more detailed view of the array of FIG. 3.

In order to better describe the invention, a detailed account of the configuration of a user programmable logic block of a system in accordance with the present invention will now be described. FIG. 4 shows a user programmable logic block 40 comprising internal registers 41 which are chained together using either dedicated configuration wires or wires which form part of the general routing network of the re-configurable device/fabric.

In operation, configuration data is shifted along the chains 42 until each register 41 on the chain contains data. This occurs under the control of configuration control signals which may also be fed into the device/fabric via chains of internal registers. However, it is likely that all registers on a particular chain will be addressed/accessed in the same way at any given time so control data may be distributed via semi-global non-registered signals to all stages of the configuration data chain. The control information is then decoded at each stage to perform read/write/shift operations on the data in the configuration chains and related configuration cells 43 within the programmable logic blocks.

Figure 5:
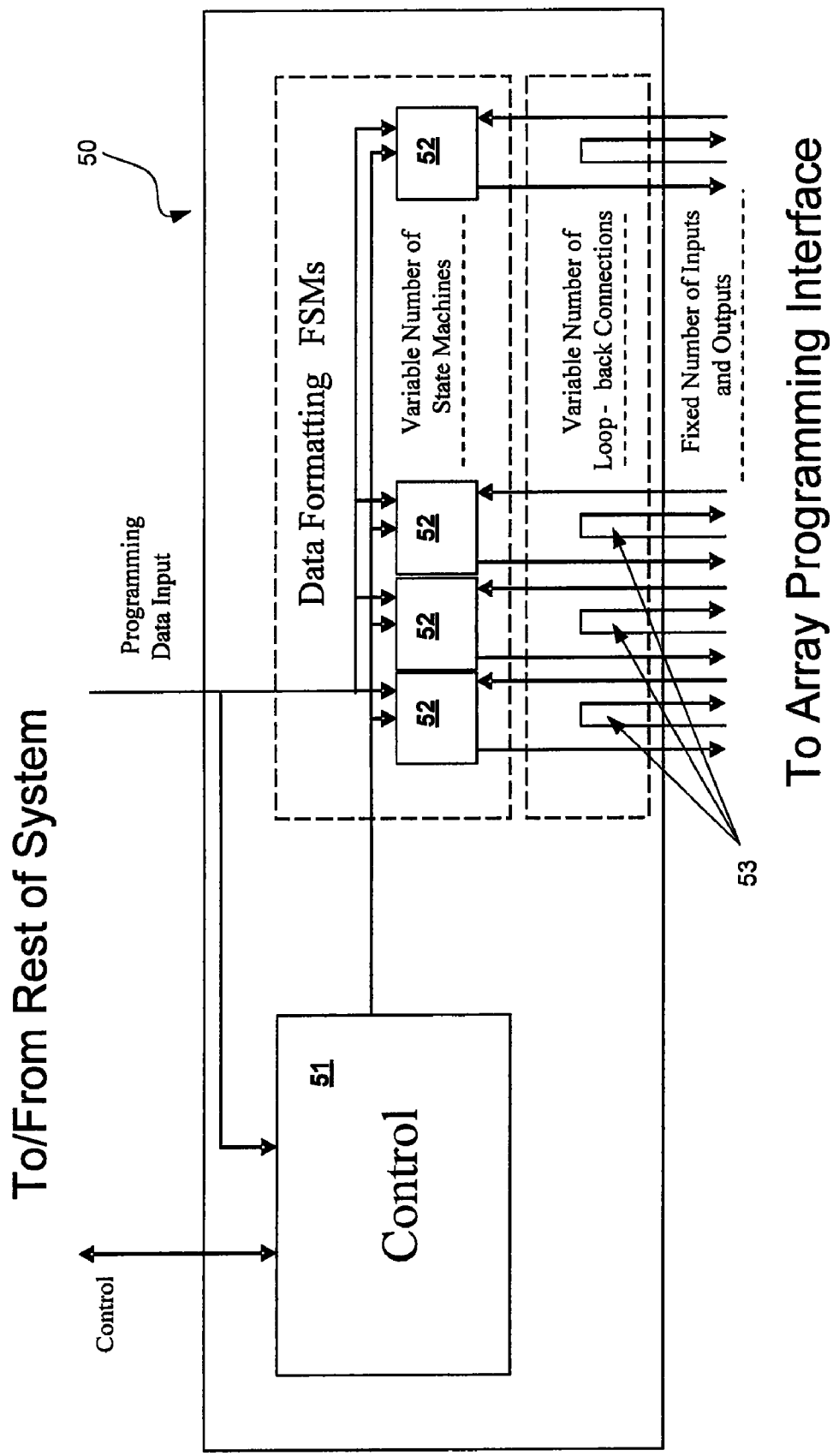
FIG. 5 shows a representation of a device in accordance with the present invention.

With reference to FIG. 5, one embodiment of the present invention will now be described. A device 50 in accordance with the present invention comprises an arrangement of connections within the programming interface which allow the choice of parallel or serial configuration to be fixed in the programming interface as opposed to in the array itself. Typically, each of the programming interfaces of an array (i.e. above and below the array) will comprise a device 50 in accordance with the present invention.

As shown in FIG. 5, the device 50 in accordance with the present invention comprises a variable number of Finite State Machines (FSMs) 52 and loop-back connections 53, some inputs and outputs of which connect directly to the input/output connections at the end of the array columns. As will be appreciated, a Finite State Machine is a circuit often used for controlling sequences of actions in response to its current state (stored in some form of internal memory) and external inputs. In this way, FSMs 52, in response to external control signals, generate the control signals necessary to cause the writing and reading of data to and from the memory elements. It should be noted however that any other suitable programmable connection means could be used in place of the FSMs.

For the sake of completeness, both the loop-back connections 53 and the FSMs 52 for each array column are shown. As will be appreciated however, in an actual programming interface, each input/output of each array column is effectively connected to either a loop-back connection 53 or an FSM 52. Thus, the number and position of loop-back connections 53 and the number and connectivity of FSMs 52 are varied.

Accordingly, a programmable logic device in accordance with the present invention comprises a generic array having each input/output of each array column exposed and at least one customised programming interface.

The advantage of this is that the same array design can be embedded in multiple systems by multiple users, each with different requirements regarding configuration speed and overhead. Moreover, there are many ways to arrange the programming interface so that varying degrees of parallelism can be exhibited, Having fine control of the degree of parallelism (and therefore overhead) is advantageous.

The device of the present invention may further comprise a control block 51 for controlling the FSMs 52 and for controlling the input and output of data from and to the rest of the system. The controller 51 may also perform several functions which are common to all FSMs 52, thereby minimising the need for replicating these functions in each FSM 52. The controller 51 may, for example, decode a reset command from the programming data, which would cause it to reset all of the FSMs 52, It may also implement error checking on the incoming programming data.

Figure 6:
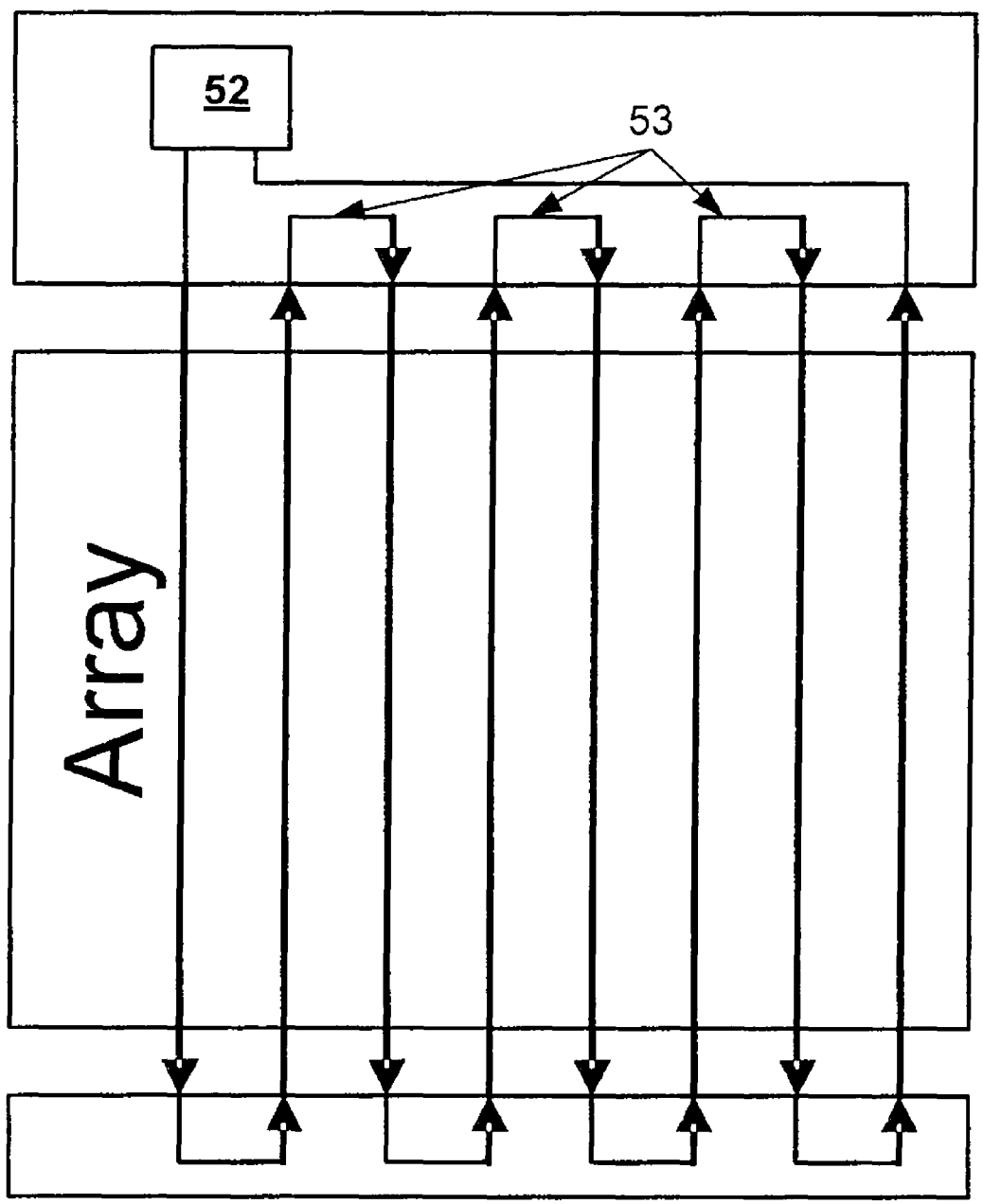
FIG. 6 is a diagram representing a first arrangement which can be achieved using a device in accordance with the present invention.

FIG. 6 shows a fully serial implementation of the present invention. In this configuration, all but two of the exposed array column connections of the array are connected to loop-back connections 53. If the time to program the resources connected to one vertical wire is T, then the illustrated arrangement would take 8T to program. The overhead is that the programming interface contains 1 FSM 52 of a certain size.

Figure 7:
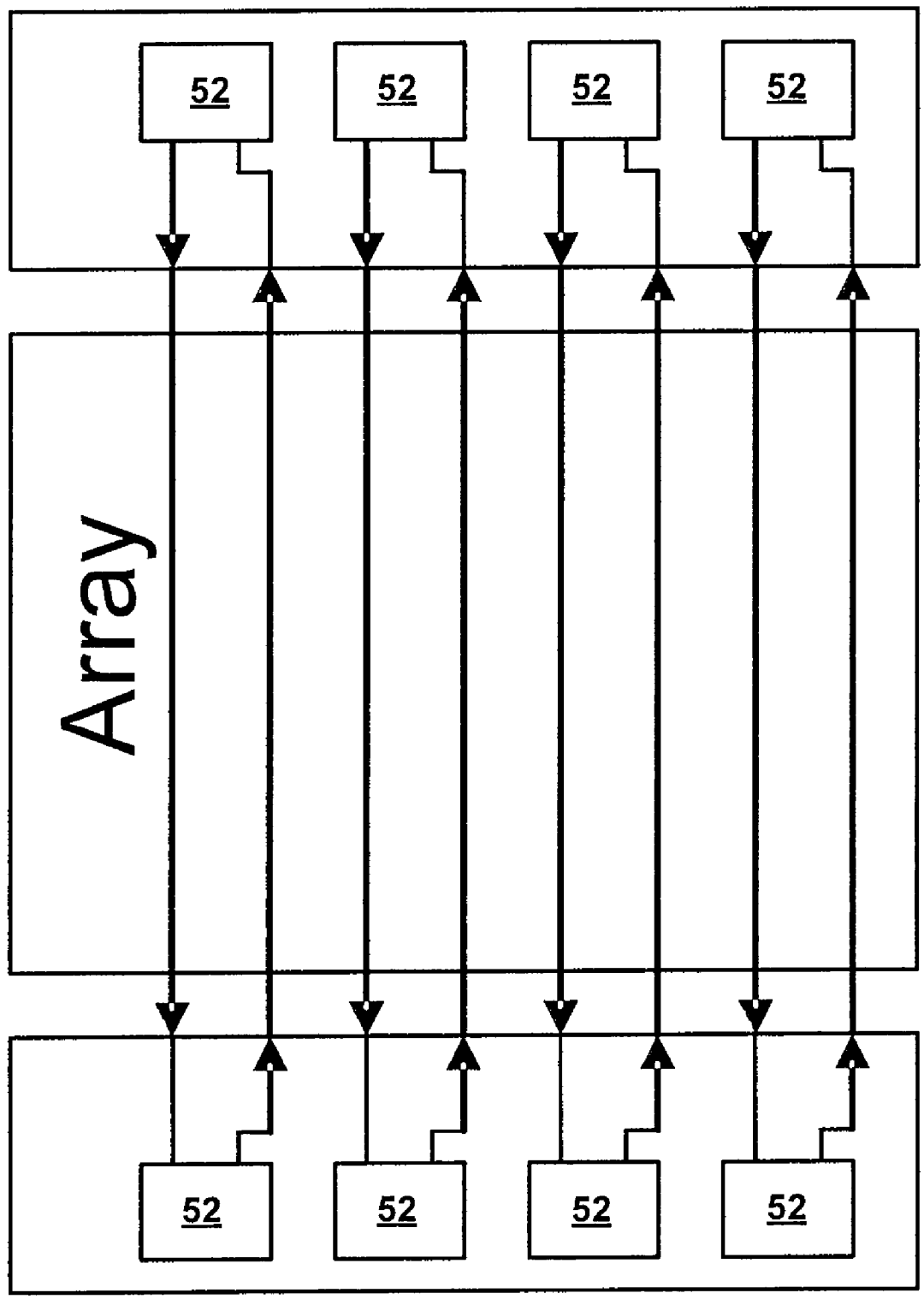
FIG. 7 is a diagram representing a second arrangement which can be achieved using a device in accordance with the present invention.

FIG. 7 shows a fully parallel implementation of the present invention in which all the exposed array column connections of the array are connected to a single FSM 52, by way of a plurality of loop-back connections 53. In this embodiment, the time to program the array is T and the overhead is 8 FSMs.

Figure 8:
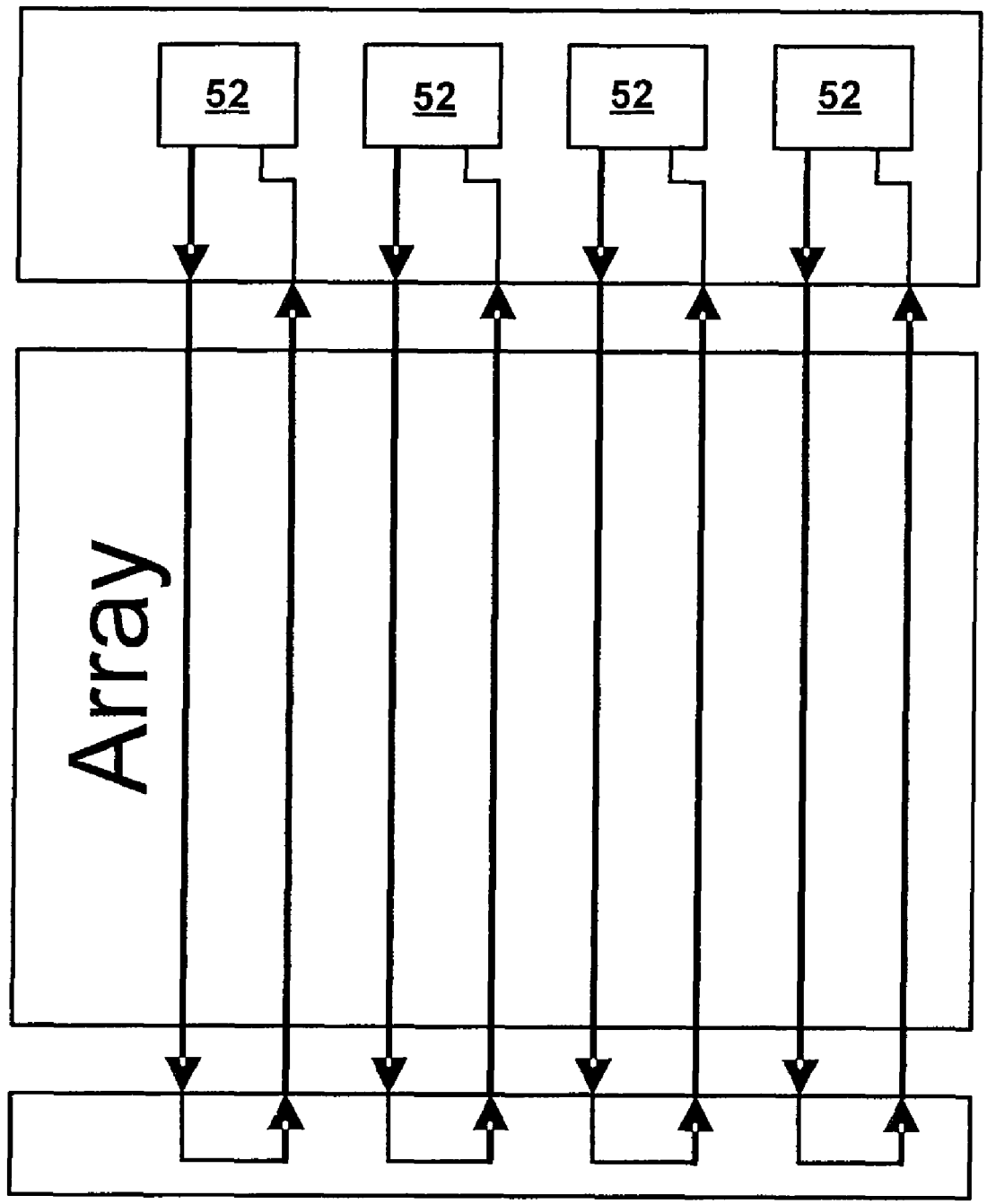
FIG. 8 is a diagram representing a third arrangement which can be achieved using a device in accordance with the present invention.

FIG. 8 shows a half-parallel implementation of the present invention where the exposed array column connections are divided into 4 groups. In this embodiment, the time required to program the array is 2T and the overhead is 4 FSMs 52.

Figure 9:
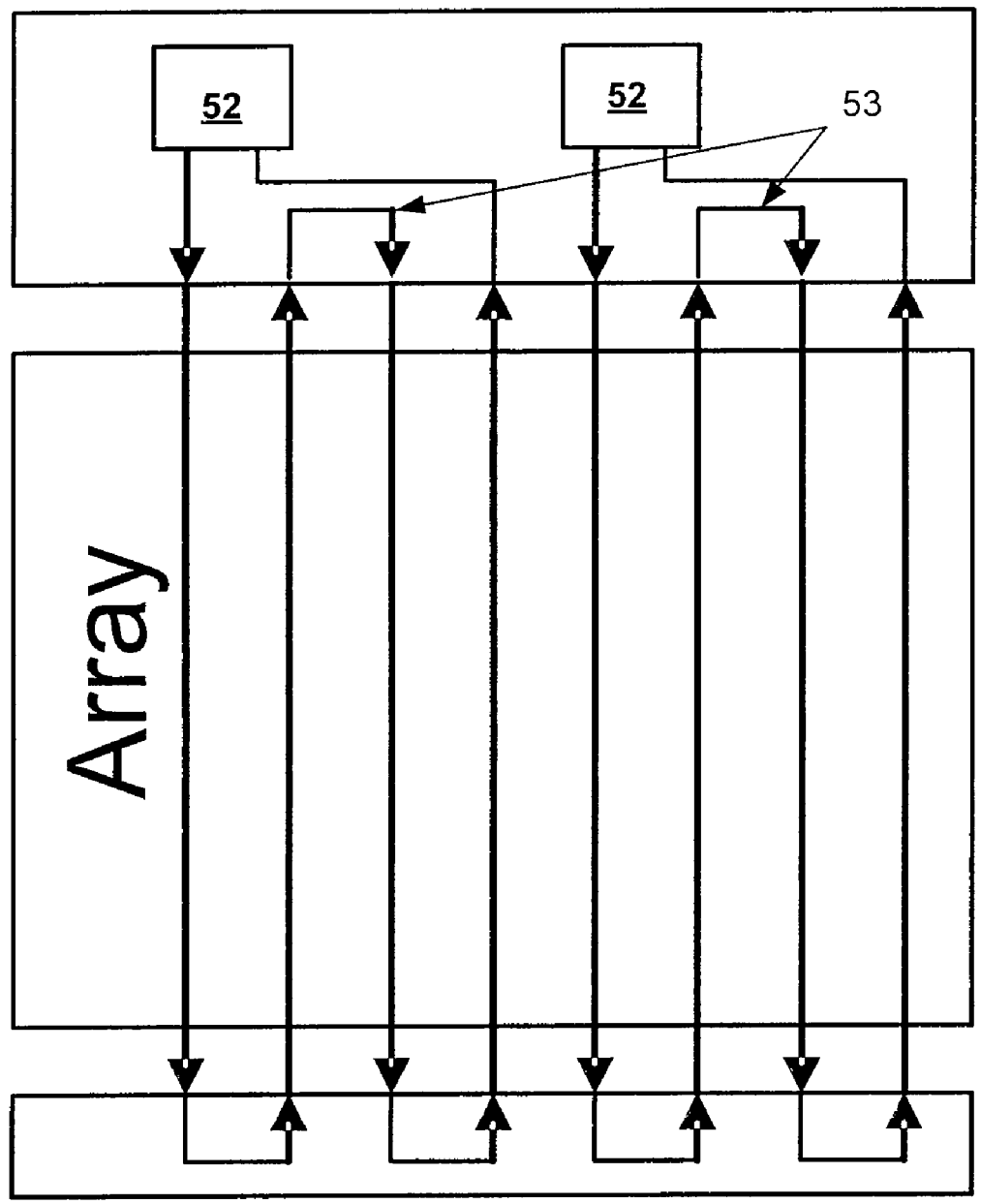
FIG. 9 is a diagram representing a fourth arrangement which can be achieved using a device in accordance with the present invention.

FIG. 9 shows another implementation of the present invention where the exposed array column connections are divided into 2 groups. In this embodiment, the time required to program the array is 4T and the overhead is 2 FSMs 52.

Figure 10:
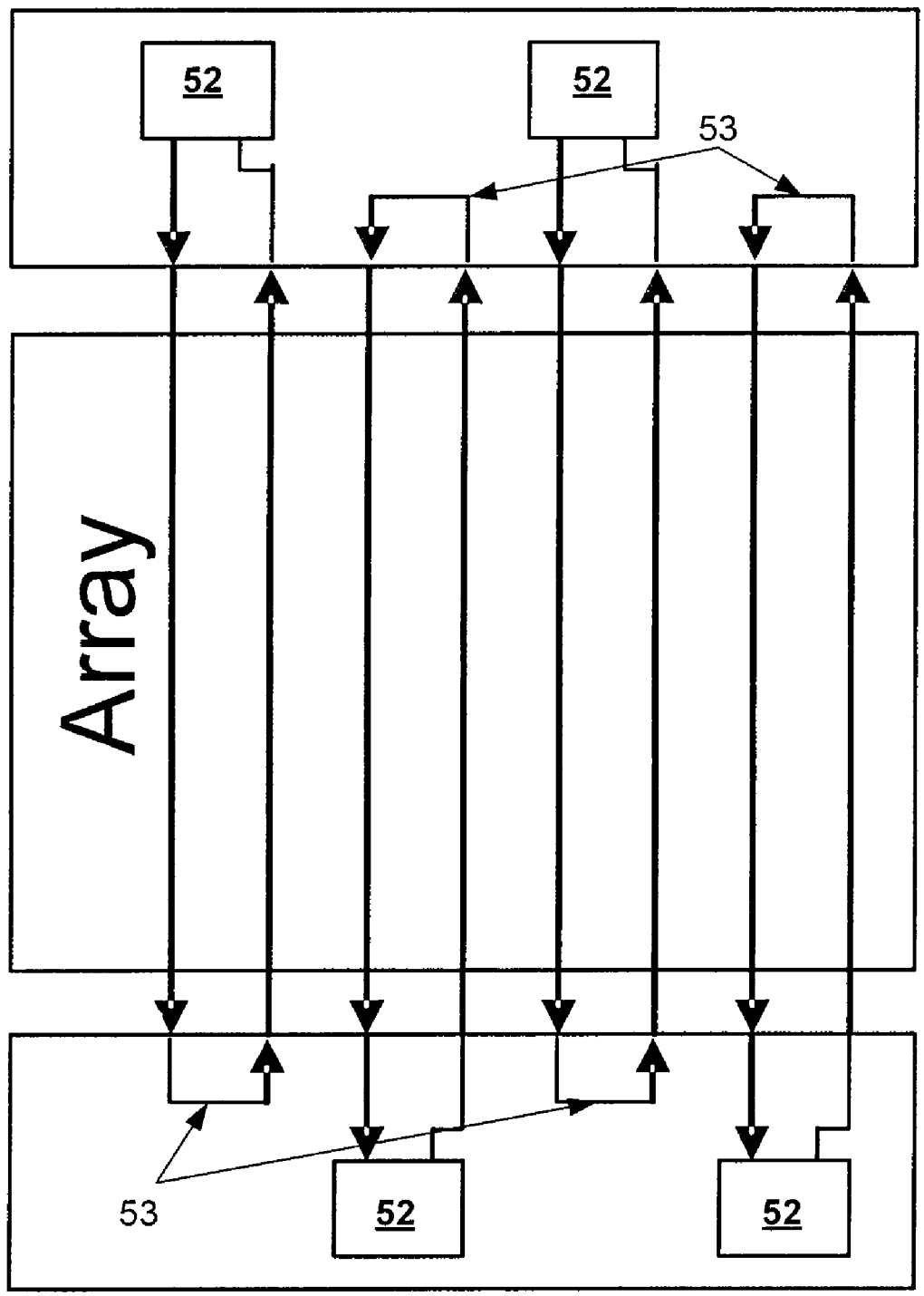
FIG. 10 is a diagram representing a fifth arrangement which can be achieved using a device in accordance with the present invention.

Finally, FIG. 10 shows an alternative half-parallel implementation of the present invention where the exposed array column connections are divided into 4 groups. This implementation differs from that shown in FIG. 8 however, in that, in this embodiment, two FSMs 52 are used in the upper programming interface and two FSMs 52 are used in the lower programming interface. Similarly to the embodiment shown in FIG. 6 however, the time required to program the array is 2T and the overhead is 4 FSMs 52.

The invention claimed is:

1. A programmable logic device, comprising:
a plurality of repeating blocks, each of which comprises an input and an output of a configuration data path on both of a top end and a bottom end thereof; and
a plurality of configuration registers which are linked by the configuration data path, wherein:
the plurality of repeating blocks form an array, in which each input of the plurality of repeating blocks is connected to a corresponding output of the plurality of repeating blocks, the programmable logic device further comprises a programming interface device, the programming interface device comprising a plurality of finite state machines, a plurality of loop-back connections and a control circuit, and
the programming interface device is connected to at least one of a top and a bottom of the array,
wherein the plurality of finite state machines are configured to generate a signal causing writing or reading of configuration data to and from at least one of the plurality of configuration registers included in at least one of the plurality of repeating blocks of a same column of the array.

2. The programmable logic device of claim 1, wherein the control circuit is configured to connect, either one of the plurality of finite state machines or one of the plurality of loop-back connections, or both of one of the plurality of finite state machines and one of the plurality of loop-back connections, to each column of the array.

* * * * *